United States Patent
Blanc-Magnard et al.

(10) Patent No.: US 7,772,350 B2
(45) Date of Patent: Aug. 10, 2010

(54) METHOD FOR PREPARING POLYORGANOSILOXANES (POS) BY RING (S)—OPENING POLYMERIZATION AND/OR POS REDISTRIBUTION IN THE PRESENCE OF CARBENE (S) AND POS COMPOUNDS PRODUCED BY SAID METHOD

(75) Inventors: Delphine Blanc-Magnard, Lyons (FR); Sébastien Sterin, Saint Cyr Au Mont D'or (FR); Etienne Fleury, Irigny (FR); Olivier Buisine, Lyons (FR); Antoine Baceiredo, Toulouse (FR)

(73) Assignees: Rhodia Chimie, Boulogne-Billancourt (FR); Centre National de la Recherche Scientifique-CNRS, Paris (FR)

( * ) Notice: Subject to any disclaimer, the term of this patent is extended or adjusted under 35 U.S.C. 154(b) by 641 days.

(21) Appl. No.: 10/584,774

(22) PCT Filed: Dec. 8, 2004

(86) PCT No.: PCT/FR2004/050665

§ 371 (c)(1),
(2), (4) Date: Aug. 13, 2007

(87) PCT Pub. No.: WO2005/073279

PCT Pub. Date: Aug. 11, 2005

(65) Prior Publication Data

US 2008/0097064 A1    Apr. 24, 2008

(30) Foreign Application Priority Data

Dec. 30, 2003  (FR)  .................................... 03 51232

(51) Int. Cl.
*C08G 77/06* (2006.01)
(52) U.S. Cl. .............................. 528/12; 528/21; 528/23
(58) Field of Classification Search .................... 528/12
See application file for complete search history.

(56) References Cited

U.S. PATENT DOCUMENTS

| 5,077,414 A | 12/1991 | Arduengo, III | ............... 548/335 |
| 5,124,417 A | 6/1992 | Farooq | ........................ 526/90 |

FOREIGN PATENT DOCUMENTS

WO    WO 03/099909    12/2003

OTHER PUBLICATIONS

Journal of Organometallic Chemistry 692 (2007) 705-708.*
Rodriguez et al, Journal of Organometallic Chemistry 692 (2007) 705-708.*
Nyce et al., "In Situ Generation of Carbenes: A General and Versatile Platform for Organocatalytic Living Polymerization," 125 *J.Am. Chem.Soc.* 3046-3056 (2003).

* cited by examiner

*Primary Examiner*—Randy Gulakowski
*Assistant Examiner*—Lindsay Nelson
(74) *Attorney, Agent, or Firm*—James C. Lydon

(57) ABSTRACT

A method for preparing polyorganosiloxanes (POS) by a ring-opening polymerization and/or linear, non-linear or cyclic POS redistribution in the presence of a nucleophilic carbene. The initial efficiency of the POS conversion is substantially increased at low temperature, resulting in less residual content of initial POS.

32 Claims, No Drawings

METHOD FOR PREPARING POLYORGANOSILOXANES (POS) BY RING (S)—OPENING POLYMERIZATION AND/OR POS REDISTRIBUTION IN THE PRESENCE OF CARBENE (S) AND POS COMPOUNDS PRODUCED BY SAID METHOD

The field of the invention is that of the synthesis of silicones: PolyOrganoSiloxanes (POSs), by ring-opening and/or redistribution polymerization of linear and/or nonlinear and/or cyclic POSs.

More specifically, the invention relates to a method for preparing POSs by ring-opening and/or redistribution polymerization of POSs, in particular of POScy, in the presence of a catalyst (or initiator) composed of at least one nucleophilic carbene.

The invention is also directed toward compositions of POSs and of a carbene catalyst, used in these reactions for the ring-opening/redistribution polymerization of cyclic POSs (POS), resulting in POS oils (molar mass ranging, for example, from $10^3$ to $10^4$) or in POS gums (molar mass ranging, for example, from $10^3$ to $10^7$).

The invention also relates to certain POSs or silanes substituted with catalytic carbene functions, as novel products per se.

Silicones are nowadays widely used in industry. Most of them are polymerized siloxanes or are based on these derivatives. For this reason, the synthesis of these polymers by ring-opening polymerization is a very important line of research and numerous publications on this subject have appeared. Ring-opening polymerization of oligosiloxanes uses monomers that can be readily synthesized and purified and, in addition, it allows better control of the molecular weight of the polymer obtained. In practice, this method is one of the industrial routes used to date.

Ring-opening polymerization (ROP) of cyclic organosiloxanes is a technique widely used in the silicone industry for preparing oils, gums or resins, which may or may not be functionalized.

Ring-opening polymerization of oligosiloxanes is a complex process:

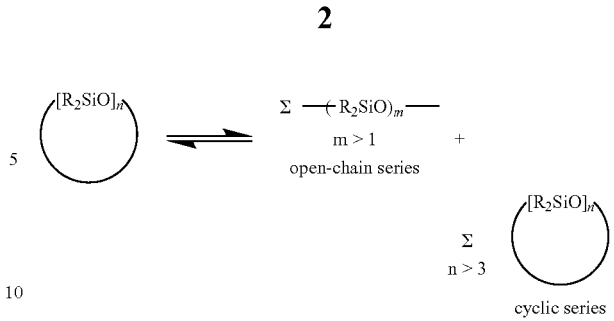

The monomers most commonly used at the current time are octamethylcyclotetrasiloxane ($D_4$) and hexamethylcyclotrisiloxane ($D_3$). The polymerization can be carried out by the anionic route via basic catalysts or by the cationic route via acidic catalysts.

The cationic route is often preferred for the synthesis of linear POSs because the reaction takes place at a sufficiently fast rate and at ambient temperature and the initiator can be easily removed from the polymer. The drawback to this method is the significant formation of cyclic POSs, which appear particularly at the beginning of the polymerization. This method of polymerization is based on the increase in the reactivity of the Si—O bond for monomers having a strained ring, such as cyclotrisiloxanes. The use of these substrates makes it possible to operate under conditions of kinetic control.

For cationic polymerization, Brönsted acid-type catalysts or proton catalysts such as $H_2SO_4$, $HClO_4$ or triflic acid are widely described. These acids can also be placed on inorganic solid supports, for example. These catalysts are effective at moderate temperatures, for example of the order of 50 to 100° C. Lewis acids: $AlCl_3$, $SbCl_5$, $SnCl_4$, etc., may also be suitable, but require high temperature conditions (>200° C.). Phospho-nitrile halides of structure $Cl_3PNPCl_2NPCl_3.PCl_6$ are also described as ring-opening polymerization catalysts that are effective at temperatures of from 40 to 120° C. These are also good condensation catalysts.

The anionic route is more commonly used for the formation of linear polymers of high molecular weight.

This process comprises 3 steps:

1- the initiation phase is the attack on the siloxane by the base so as to result in the formation of a silanolate at the chain end:

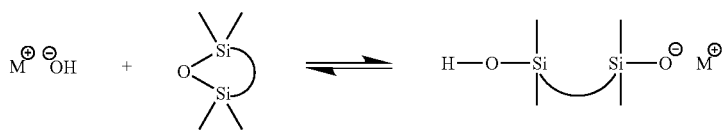

-2- extension-shortening of the chains:

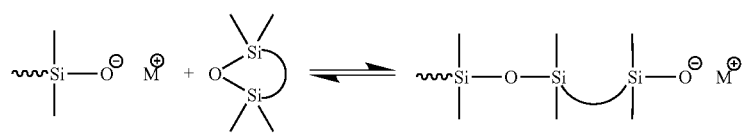

-3- interchain exchanges (mixture with chains, redistribution):

M corresponds to an alkali metal or to an alkaline earth metal in the above schemes.

When the equilibrium conditions are reached, a mixture of POScy and of linear POSs is obtained.

Many different initiators are used to carry out this polymerization; for example, alkali metal or alkaline earth metal hydroxides or complexes of alkali metal or alkaline earth metal hydroxides with alcohols, and alkali metal or alkaline earth metal silanolates. The latter make it possible to avoid the initiating step. The polymerization reaction requires a high temperature. The reaction can be carried out under dry conditions, in a solvent or in an emulsion. The polymerization can be stopped using an acid additive which reacts with the initiator or with the polymer chains to render the latter unreactive. Furthermore, these additives can be used to regulate the molecular weight of the polymer and/or to add an advantageous property. In the majority of cases, the residues from the initiator remain in the polymer produced or are removed. This is highly disadvantageous to the industrial process for the ring-opening and/or redistribution polymerization of POScy in the presence of $K^+OH^-$ or $SiO^-M^+$, which process also has the major disadvantage of being lengthy and of occurring at high temperature (for example, for $SiO^-$, $K^+$, approximately 10 hours at 150° C.). The kinetic of this reaction is related to the nature of the anion and of the counterion. For an identical anion, the softer the counterion and the greater its volume, the more rapid is the kinetic (for example, $Li^+<Na^+<K^+<NR_4^+<PR_4^+$). The solubility of the initiator in the reaction medium is also very important with regard to the kinetic. Thus, KOH is relatively insoluble and must therefore be used under high temperature conditions ($\geq 150°$ C.).

Other catalytic compounds exist, such as quaternary phosphoniums, in particular tetrabutylphosphonium hydroxide, and quaternary ammoniums such as tetramethylammonium hydroxide. These catalysts are soluble in the polyorganosiloxane medium and can polymerize D4 at temperatures of between 70 and 130° C. These catalysts are sensitive to the presence of water and degrade thermally from 130-150° C.

Finally, superbases referred to as Schwesinger bases, which readily generate, in the presence of water or of methanol, hydroxides or corresponding methoxides, are excellent polymerization catalysts. In fact, these systems which have a soft counterion exhibit a low tendency toward ion pair association and promote the initiation and the polymerization of organocyclosiloxanes. These catalysts operate at low temperature (80° C.) and at high temperature (140° C.) and are suitable for continuous processes. They are very expensive.

Thus, the following European patent applications: EP-A-0 860 459, EP-A-0 860 460 and EP-A-0 860 461, relate to the use of phosphazene superbases for the ring-opening polymerization of POScy, in the presence of water and, optionally, of a filler (silica), or even by blocking the polymerization reaction using $CO_2$ or acid.

U.S. Pat. No. 5,994,490 discloses a similar system which is obtained by mixing phosphazenes and a tertiary alcohol: e.g. tert-butanol.

The following European patent applications: EP-A-1 008 598, EP-A-1 008 610, EP-A-1 008 611 and EP-A-1 008 612, themselves also disclose phosphazene superbases of $[(Me_2N)_3 P=N-((Me_2)N_2P=N)_nP^+(NMe_2)]$, $OH^-$ or $[(Me_2N)_3 P=N]_3P=N$-t-Bu type for the ring-opening polymerization of POSs.

French patent application FR-A-2 708 586 discloses linear phosphazenes of formulae: $OCl_2P(NPCl_2)nNPCl_2X$ with X=OH, O or Cl, of use as catalysts for the ring-opening polymerization and redistribution of POSs, and the reaction products of these linear phosphazenes with water or an alcohol.

European patent application EP-A-0 982 346 describes a method for producing a POS having a content of volatile compounds (POScy) of less than 1% by weight, by means of a condensation polymerization of a siloxane bearing silanol groups or by means of a ring-opening polymerization of POScy (D4), with a superbase of phosphazene type and in the presence of water. After neutralization of the catalyst, the POS obtained is subjected to a revaporization treatment in order to remove the volatile compounds (D4), at more than 200° C. PCT application WO-A-98/54229 describes the use of phosphorus ylides of formula $(Me)_2C=P(NMe_2)_3$ [and of their precursor $(Me)_2C-P^+(NMe_2)_3$, $Y^-$ with Y=halogen or triflate] as weakly nucleophilic strong base in reactions for the C-alkylation of lactams, succinimides, oligopeptides and benzodiazepines.

PCT application WO-A-03/054058 relates to the synthesis of silicone by anionic polymerization of cyclic organo-siloxane oligomers, in the presence of a weakly nucleophilic superbase based on aminophosphonium ylide derivatives of formula 3 below:

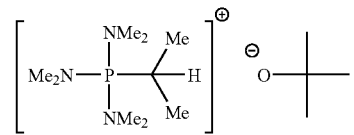

3 or of phosphoranylidene derivatives of formula 6:

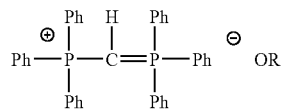

6

In any event, the polymerization of POScy, for example of D4s, with anionic or cationic initiators is almost always accompanied, as yet, by "back biting" reactions resulting in a thermodynamic equilibrium, the consequence of which is the presence at the end of the reaction of a not insignificant amount of cyclic monomers (from 15 to 30%).

Moreover, platinum/carbene complexes are known as catalysts for the hydrosilylation of POSs comprising ≡Si-vinyl units, by means of POSs comprising ≡Si—H units. By way of example, mention may be made of PCT application WO-A-02/098971, which describes a silicone composition that can be crosslinked to an elastomer by hydrosilylation, in the presence of carbene-based metal catalysts. This composition comprises:

a polyorganovinylsiloxane (polydimethyl)-(methylvinyl) siloxane,
a polyorganohydrogenosiloxane,
a platinum catalyst formed by a complex C3 or C4:

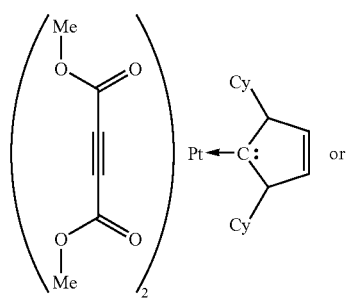
(C3)

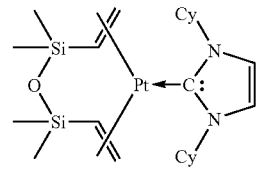
(C4)

optionally, a crosslinking inhibitor,
and, optionally, a filler.

Hydrosilylation is neither a ring-opening polymerization nor a redistribution polymerization. In such a hydrosilylation, the carbene plays only the role of a platinum ligand.

Carbenes used as catalytic metal ligands are exploited in fields other than that of silicones. Thus, patent EP-B-0 971 941 describes catalysts based on ruthenium and osmium/carbene complexes, for the thermal metathesis of cycloolefins.

In addition, an article by J. L. Hedrick et al., published in 2002 (JACS 124, No. 6 p 914-915, 2002) teaches that N-heterocyclic carbenes can be used as a catalyst for the polymerization of cyclic esters. More specifically, 1,3-bis(2,4,6-trimethylphenyl)imidazole-2-ylidene was tested as a catalyst for the polymerization of L-lactide, of ε-caprolactone and of β-butyrolactone, in the presence of an alcohol used as initiator. From a mechanistic point of view, the authors think that, since the pKa is very high (pKa=24, measured in dimethyl sulfoxide), the carbene is very nucleophilic and can therefore attack the cyclic ester monomer to give an activated species capable of attacking the alcohol of the initiator or of the growing chain according to an initiation/propagation process represented below:

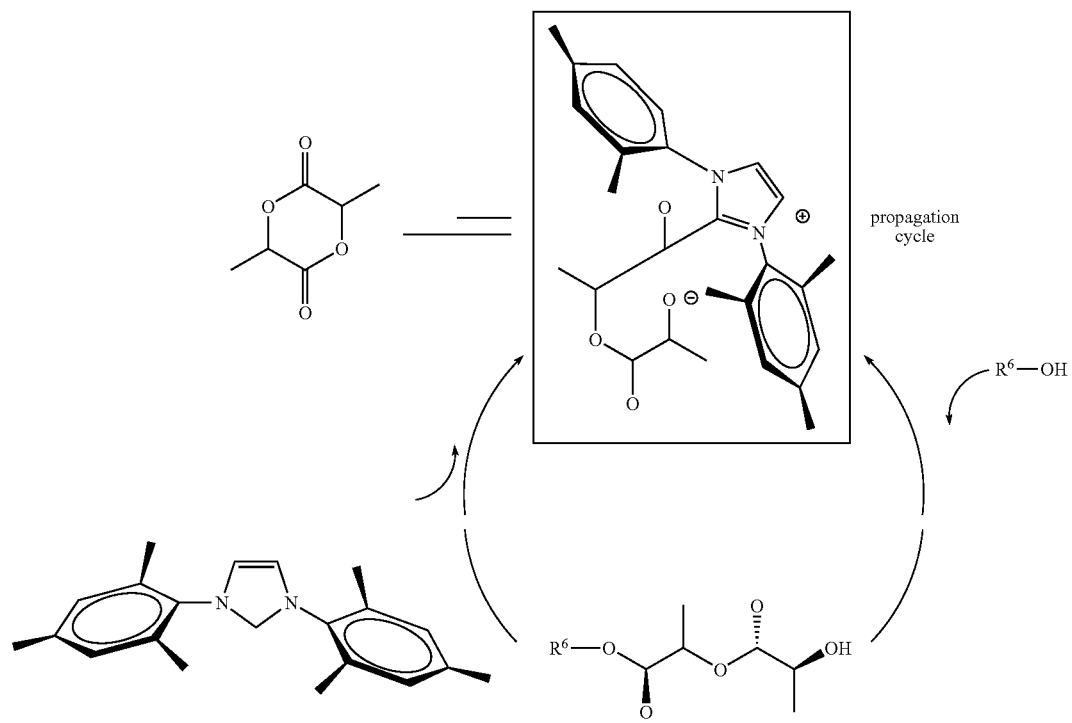

A more recent and more complete article (cf. JACS 125, No. 10 p 3046-3056, 2003) describes the preparation of carbene in situ in order to avoid the problems of hydrolysis. The promoters used are of thiazolium, imidazolium and imidazolinium type, giving, respectively, thiazol carbene, imidazol-2-ylidene carbene and imidazolin-2-ylidene carbene catalysts, when they are brought into the presence of potassium tert-butoxide. Polymerization tests show that the first family of catalysts does not make it possible to profitably and selectively obtain high molecular weights.

In such a state of the art, one of the essential objects of the invention is to improve the preparation of POSs by ring-opening and/or redistribution of POSs, by means of a catalytic system which is more effective than those used previously, even at low temperature, and which makes it possible to profitably and selectively obtain a functionalized or nonfunctionalized, linear or nonlinear polyorganosiloxane.

Another essential object of the invention is to provide a novel method for synthesizing silicones, polyorganosiloxanes, by ring-opening and/or redistribution polymerization of linear or cyclic POSs, in which the yield from conversion, at ambient temperature, of the initial POSs (for example of D4) is considerably increased compared with what exists, in such a way that the residual contents of initial POSs (for example of D4) are lower than with the catalytic systems most commonly described.

Another essential object of the invention is to provide a novel method for synthesizing silicones, polyorgano-siloxanes, by ring-opening and/or redistribution polymerization of linear or cyclic—preferably cyclic—POSs, which is simple and economic to use, in particular with regard to the final purification stages, i.e., for example, the neutralization and the devolatilization.

Another essential object of the invention is to provide a novel method for synthesizing silicones, polyorganosiloxanes, by ring-opening and/or redistribution polymerization of linear or cyclic—preferably cyclic—POSs, by means of an effective catalytic system, which has at least one of the following characteristics:

soluble in silicone oils and in particular silicone gums;
simple and inexpensive to synthesize;
stable;
endowed with good stability toward hydrolysis; and which makes it possible:
to polymerize POSs, such as POScy (e.g. $D_4$), under mild conditions (low temperatures $\leqq 100°$ C.);
to reduce the reaction times, in particular for the preparation of viscous oils and of gums;
to reduce, or even eliminate, catalyst residues and residues of its derivatives in the final polymer, in order to prepare silicone polymers of high viscosity and with improved thermal stability, and in a profitable manner;
to functionalize a whole palette of cyclic, linear or nonlinear, and functionalized or nonfunctionalized POSs;
to improve the polydispersity of polymers formed and to favor the formation of linear structures in comparison with cyclic oligomers;
to easily remove possible catalyst residues;
to favor the formation of linear silicone polymers in comparison with the formation of cyclic silicone polymers;
to guarantee high reproducibility;
and to limit sensitivity to the variability in starting materials.

Another essential object of the invention is to provide an effective novel catalytic system for the synthesis of silicones, polyorganosiloxanes, by ring-opening and/or redistribution polymerization of linear or cyclic POSs, said catalytic system being endowed with all or some of the properties targeted in the objects above.

Another essential object of the invention is to provide a composition that can be used in particular for the preparation of polyorganosiloxanes (POSs) by ring-opening and/or redistribution of POSs, comprising linear POSs, nonlinear POSs or cyclic POSs (POScy) and an effective catalyst (C) endowed with all or some of the properties targeted in the objects above.

Another essential object of the invention is to provide novel POSs or silanes substituted with catalytic radicals, of use in the effective synthesis of silicones, PoSs, by ring-opening and/or redistribution polymerization of linear, nonlinear or cyclic POSs.

These objects, among others, are achieved by means of the present invention, which relates, first of all, to a method for preparing polyorganosiloxanes (POSs) by ring-opening and/or redistribution polymerization of POSs, in the presence of a catalyst (C), characterized in that this catalyst (C) comprises at least one carbene.

It is to the inventors' credit to have overcome the technical prejudice that said that, up until then, the transposition, to silicone chemistry, of carbenes used as catalysts for the polymerization of cyclic esters is neither possible nor can it be envisioned. Nothing could lead one to foresee that the carbenes or their precursors would be compatible with the silicone medium. Silicone chemistry is very far removed from lactone chemistry. Despite all this, the inventors did not hesitate to carry out lengthy and numerous trials, at the end of which they demonstrated, completely surprisingly and unexpectedly, that carbenes are particularly suitable for the preparation of silicones, polyorganosiloxanes, by anionic polymerization (ring-opening/redistribution polymerization) of linear or cyclic—preferably cyclic—polyorganosiloxanes (POSs).

The method according to the invention is not only much more effective than formerly, but also economical. It is also simple to carry out since the purification processes (neutralization/volatilization) are alleviated, or even eliminated.

This method makes it possible to obtain POSs of variable viscosity, including POSs of high viscosity.

For the purpose of the invention, the term "ring-opening polymerization" corresponds to a polymerization in which a cyclic compound (monomer) is opened so as to form a linear polymer.

For the purpose of the invention, the term "redistribution polymerization" corresponds to the meaning for those skilled in the art in silicone chemistry. In particular, the term "redistribution polymerization" is understood to mean, in the silicone field, a rearrangement of organosiloxanes of different structures and/or molar mass. This rearrangement results in a single new POS.

Advantageously, the method for preparing POSs according to the invention therefore involves a mechanism of ring-opening and/or redistribution polymerization of POSs, with the exclusion of any hydrosilylation reaction. The carbene catalyst (C) used has the characteristic of being nucleophilic and this nucleo-philicity is directly involved in the catalysis of ring-opening and/or redistribution polymerization of POSs, with the exclusion of any hydrosilylation reaction.

According to an advantageous characteristic of the invention, the carbene(s) of the catalyst (C) comprise(s) two non-bonding electrons which are in the singlet or triplet, preferably singlet, form.

Preferably, the carbene(s) of the catalyst (C) has (have) a general structure represented by formula (I°):

in which:
X and Y are independently chosen from the group comprising: S, P, Si, N and O;

X and Y are optionally substituted;

X and Y can be connected via at least one optionally substituted five-, six- or seven-membered hydrocarbon-based ring; or else a five-, six- or seven-membered heterocycle comprising one or more hetero atoms chosen from the group comprising: S, P, Si, N and O, and optionally substituted.

According to a first embodiment of the method according to the invention, the carbenes used are carbenes, which are advantageously stable, having a general structure represented by formula (I), (I') or (I''):

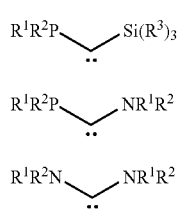

in which:
R$^1$, R$^2$ and R$^3$, which may be identical or different, independently represent an alkyl group; an optionally substituted cycloalkyl group; an optionally substituted aryl group; or the groups R$^1$ and R$^2$ can together form an optionally substituted five- or six-membered hydrocarbon-based ring; or a five- or six-membered heterocycle comprising one or more hetero atoms chosen from the group comprising: S, P, Si, N and O, and optionally substituted.

According to a second embodiment of the method according to the invention, the carbene(s) of the catalyst (C) correspond(s) to formula (II) or (II'):

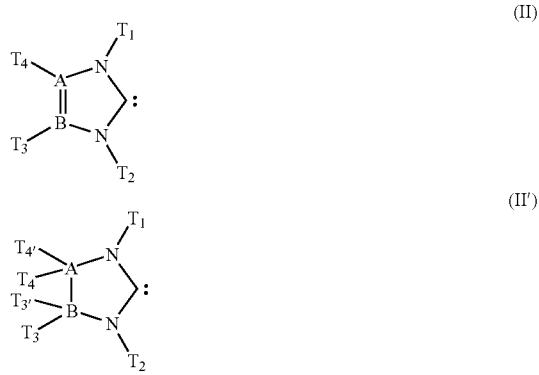

in which:
A and B independently represent C or N, it being understood that:
in formula (II), when A represents N, then T4 is not present, and when B represents N, then T3 is not present;
in formula (II'), when A represents N, then T4 or T4' is not present, and when B represents N, then T3 or T3' is not present;
T3, T3', T4 and T4' independently represent a hydrogen atom; an alkyl group; a cycloalkyl group optionally substituted with alkyl or alkoxy; an aryl group optionally substituted with alkyl or alkoxy; an alkenyl group; an alkynyl group; or an arylalkyl group in which the aryl part is optionally substituted with alkyl or alkoxy; or T3 and T4 can form, together and with A and B when the latter each represent a carbon atom, an aryl, it being understood that, in this case, T3' and T4' are not present;

T1 and T2 independently represent an alkyl group; an alkyl group optionally substituted with alkyl; an alkyl group that is perfluorinated or optionally substituted with a perfluoroalkyl group; a cycloalkyl group optionally substituted with alkyl or alkoxy; an aryl group optionally substituted with alkyl or alkoxy; an alkenyl group; an alkynyl group; or an arylalkyl group in which the aryl part is optionally substituted with alkyl or alkoxy; or T1 and T2 independently represent a monovalent radical of formula (V) below:

$$-V1-V2 \qquad (V)$$

in which:
V1 is a saturated or unsaturated, hydrocarbon-based divalent group, preferably an optionally substituted linear or branched C$_1$-C$_{10}$ alkylene, V2 is a monovalent group chosen from the group of the following groups:
alkoxy, —OR$^a$ with R$^a$ corresponding to hydrogen, alkyl or aryl;
silyl, —Si(OR$^b$)$_x$(R$^c$)$_{3-x}$ with R$^b$ corresponding to hydrogen, alkyl, silyl or siloxanyl, R$^c$ corresponding to alkyl or aryl, and x being an integer between 0 and 3;
amine, preferably —N(R$^a$)$_2$ with R$^a$ corresponding to hydrogen, alkyl or aryl; or the groups T1, T2, T3, T3', T4 and T4' can form, in pairs, when they are located on two adjacent vertices in formulae (II) and (II'), a saturated or unsaturated hydrocarbon-based chain.

The term "alkyl" denotes a linear or branched, saturated hydrocarbon-based chain, that is optionally substituted (e.g. with one or more alkyls), preferably containing from 1 to 10 carbon atoms, for example from 1 to 8 carbon atoms, better still from 1 to 7 carbon atoms.

Examples of alkyl groups are in particular methyl, ethyl, isopropyl, n-propyl, tert-butyl, isobutyl, n-butyl, n-pentyl, isoamyl and 1,1-dimethylpropyl.

The alkyl part of the alkoxy group is as defined above. The alkyl group which is perfluorinated or optionally substituted with a perfluoroalkyl group preferably corresponds to the formula:

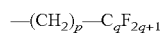

in which p represents 0, 1, 2, 3 or 4; q is an integer from 1 to 10; and C$_q$F$_{2q+1}$ is linear or branched. Preferred examples of this group are: —(CH$_2$)$_2$—(CF$_2$)$_5$—CF$_3$ and —(CF$_2$)$_7$—CF$_3$.

The expression "aryl" denotes an aromatic hydrocarbon-based group containing from 6 to 18 carbon atoms, which is monocyclic or polycyclic, and preferably monocyclic or bicyclic. It should be understood that, in the context of the invention, the expression "polycyclic aromatic group" is intended to mean a group having two or more aromatic rings, which are condensed (ortho-condensed or ortho- and pericondensed) with one another, i.e. having, in pairs, at least two carbons in common.

Said aromatic hydrocarbon-based group ("aryl") is optionally substituted, for example, with one or more C$_1$-C$_3$ alkyls, one or more halogenated hydrocarbon-based groups (e.g. CF$_3$), one or more alkoxys (e.g. CH$_3$O) or one or more hydrocarbon-based groups comprising one or more ketone units (e.g. CH$_3$CO—).

By way of example of aryl, mention may be made of phenyl, naphthyl, anthryl and phenanthryl radicals.

The expression "arylalkyl" denotes an alkyl group as defined above, substituted with one or more aryl groups on its hydrocarbon-based chain, the aryl group being as defined above. Examples thereof are benzyl and triphenylmethyl.

The term "cycloalkyl" is intended to mean a monocyclic or polycyclic, preferably monocyclic or bicyclic, saturated hydrocarbon-based group preferably containing from 3 to 10 carbon atoms, better still from 3 to 8. The expression "polycyclic saturated hydrocarbon-based group" is intended to mean a group having two or more cyclic rings attached to one another via a bonds and/or condensed in pairs.

Examples of polycyclic cycloalkyl groups are adamantan and norbornane.

Examples of monocyclic cycloalkyl groups are cyclopropyl, cyclobutyl, cyclopentyl, cyclohexyl, cycloheptyl and cyclooctyl.

The term "alkenyl" is intended to mean a substituted or unsubstituted, linear or branched, unsaturated hydrocarbon-based chain having at least one olefinic double bond, and more preferably a single double bond. Preferably, the alkenyl group has from 2 to 8 carbon atoms, better still from 2 to 6. This hydrocarbon-based chain optionally comprises at least one hetero atom such as O, N or S.

Preferred examples of alkenyl groups are allyl and homoallyl groups.

The term "alkynyl" is intended to mean, according to the invention, a substituted or unsubstituted, linear or branched, unsaturated hydrocarbon-based chain having at least one acetylenic triple bond, and more preferably a single triple bond. Preferably, the alkynyl group has from 2 to 8 carbon atoms, better still from 2 to 6 carbon atoms. By way of example, mention may be made of the acetylenyl group, and also the propargyl group. This hydrocarbon-based chain optionally comprises at least one hetero atom such as O, N or S.

The term "silyl" is intended to mean, according to the invention, a linear or branched group containing at least one silicon atom. Polydimethylsiloxane chains are examples of silyl groups.

The carbenes of formulae (II) and (II') can have at least two condensed rings, i.e. at least two groups from T1, T2, T3, T3', T4 and T4', located on two adjacent vertices, together form a saturated or unsaturated hydrocarbon-based chain preferably having from 3 to 6 carbon atoms. The expression "saturated or unsaturated hydrocarbon-based chain" is intended to mean a linear or branched hydrocarbon-based chain which may or may not have one or more unsaturations of olefinic double bond or acetylenic triple bond type.

As regards to the preferred embodiments in formula (II) or (II'), they are forms in which A=B=carbon atom in formula (II) given above.

Preferred meanings for T1 and T2 in this formula (II) are:
alkyl, in particular n-propyl, n-pentyl or neopentyl (—$CH_2$—$C(CH_3)_3$);
cycloalkyl, in particular cyclopentyl, cyclohexyl or adamantyl;
alkenyl, in particular allyl (—$CH_2$—CH=$CH_2$) or methallyl (—$CH_2$—$C(CH_3)$=$CH_2$);
alkynyl, in particular propargyl or homopropargyl (—$(CH_2)_2$—C≡CH);
or monovalent group (V) defined above, in particular:

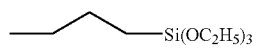

Still in formula (II), and preferably, T3 and T4 both correspond to hydrogen or together form an aryl, and better still a phenyl.

By way of examples of carbenes, mention may be made of those described in table 2, page 48 of the publication "Bourissou et al. *Chem. Rev.* 2000, 100, 39-91". This table 2, on page 48, is included in the present disclosure by way of reference.

In accordance with the invention, the carbene(s):
is (are) prepared separately,
and/or is (are) generated in situ from at least one precursor.
Advantageously, the precursor(s) is (are) a salt (salts) corresponding to the carbene(s), which is (are) reacted with at least one base, so as to generate the carbene(s) in situ.

Thus, for the preferred carbenes of formula (II) and (II'), the corresponding salt(s) is (are) one (or more) corresponding heterocyclic salt(s) of general formula (III) or (III'):

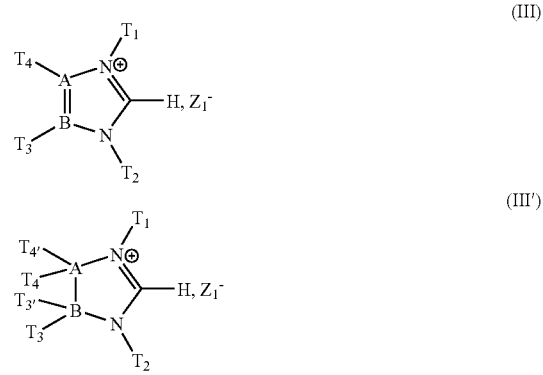

in which:
A, B, T1, T2, T3, T3', T4 and T4' are as defined above;
$Z_1$ independently represents an anion derived from a Brönsted acid (protic acid) preferably chosen from the group comprising:
carboxylic acids of formula $G_o$-COOH in which $G_o$ represents an alkyl, and advantageously a $C_1$-$C_{22}$ alkyl; an aryl, advantageously a $C_6$-$C_{18}$ aryl optionally substituted with one or more $C_1$-$C_6$ alkyls;
sulfonic acids of formula $G_o$-$SO_3H$ in which $G_o$ is as defined above;
phosphoric acids of formula $G_o$-$PO_3H$ in which $G_o$ is as defined above;
the following inorganic acids: HF, HCl, HBr, HI, $H_2SO_4$, $H_3PO_4$, $HClO_4$ and $HBF_4$ taken on their own or in combination with one another;
and mixtures thereof.

As regards the salt (III), the $Z_1^-$ anion is the anion derived from an organic or inorganic Brönsted acid (protic acid). Usually, the $Z_1^-$ anion is derived from an acid having a pKa of less than 6. Preferably, $Z_1^-$ derives from an acid having a pKa of less than 4, better still of less than 2. The pKas to which reference is made here are the pKas of the acids as measured in water.

Examples of acids are the carboxylic acids of formula: $G_o$-COOH, in which $G_o$ represents alkyl, and for example ($C_1$-$C_{22}$) alkyl; or aryl, and for example ($C_6$-$C_{18}$) aryl optionally substituted with one or more alkyls, preferably one or more ($C_1$-$C_6$) alkyls; sulfonic acids of formula: $G_o$-$SO_3H$, in which $G_o$ is as defined above; and phosphonic acids of formula: $G_o$-$PO_3H$, in which $G_o$ is as defined above; other acids are HF, HCl, HBr, HI, $H_2SO_4$, $H_3PO_4$, $HClO_4$ and $HBF_4$.

Preferred examples of carboxylic acids are acetic acid, benzoic acid and stearic acid. By way of a preferred sulfonic acid, mention will be made of benzenesulfonic acid, and by way of a preferred phosphonic acid, mention will be made of phenylphosphonic acid.

According to the invention, the $Z_1^-$ anions derived from the acids HCl, HI and $HBF_4$ and $HPF_6$ are more particularly preferred.

Thus, $Z_1^-$ anions that are particularly preferred, according to the invention, are the halide, tetrafluoroborate and hexafluorophosphate anions.

Some examples of imidazolium salts are given below.

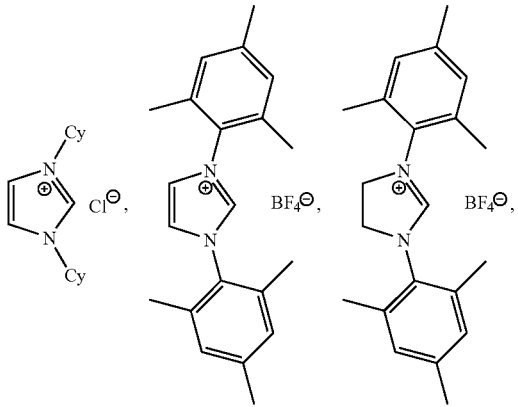

These consumables are either commercially available, or are readily prepared by those skilled in the art from commercial compounds.

A method for synthesizing the salts of formula (III) in which A=B=C is described in U.S. Pat. No. 5,077,414.

This method comprises the reaction:
of an α-dicarbonyl compound of formula (X) below:

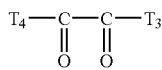          X in which T3 and T4 are as defined above
with HCHO and two amines of formulae T1-$NH_2$ and T2-$NH_2$, in the presence of an appropriate acid.

The nature of the Z1 anion in the salts of formula (III) depends on the acid used in this stage. The acids that can be used are, for example, those listed above and those from which Z1 derives.

Other methods for preparing the salts of formula (III) are proposed in Chem. Eur. J. 1996, 2, No. 12, pages 1627-1636 and Angew. Chem. Int. Ed. Engl. 1997, 36, 2162-2187.

As regards the methodological aspect of the method according to the invention, it can be carried out both continuously and batchwise.

According to a preferred methodology, the method is carried out, by homogeneous catalysis, in a liquid reaction medium in which are at least partially solubilized the catalyst (C) based on carbene(s) and/or its precursor(s) and the oligoorgano(cyclo)siloxanes, and optionally at least one base.

Advantageously, the solubility of the catalyst (C) based on carbene(s) and/or its precursor(s) is controlled by means of at least one solubilization helper and/or using one (or more) carbene(s) substituted with at least one appropriate group.

By way of examples of solubilization helpers, mention may be made of solvents such as tetrahydrofuran (THF), toluene, etc.

By way of examples of solubilization groups, mention may be made of alkyls, aryls, fluoro groups, silyls, siloxanes such as polydimethylsiloxane chains, etc. These groups can belong to formulae (I°), (I), (I'), (II), (II'), (III), (III') defined above.

One of the surprising advantages of the carbenes judiciously selected in accordance with the invention, comes from the possibility of rapid reaction at low temperature. Thus, the method is characterized in that the ring-opening and/or redistribution polymerization is carried out at a temperature T (°C) such that:
$T \leq 200$
preferably $100 \leq T \leq 150$
and even more preferably $T \leq 100$.

In practice, the temperature may be ambient temperature, which is particularly economical and easy to implement in industrial terms. However, in order to decrease the viscosity of the silicone phase, it is just as possible to operate at a higher temperature. The method according to the invention offers a great deal of flexibility in this regard.

In quantitative terms, the concentration of catalyst [C] (in mol per 100 g of initial POSs, for example linear and/or cyclic POSs) in the reaction medium is such that:
$[C] \leq 1$
preferably $10^{-5} \leq [C] \leq 10^{-1}$
and even more preferably $10^{-5} \leq [C] \leq 10^{-3}$.

The rate of ring-opening polymerization and/or of redistribution depends in particular on this concentration [C].

According to a variant of the invention, it is possible to interrupt the ring-opening and/or redistribution polymerization reaction:
by heating the reaction medium, for example to a temperature $\geq 150°$ C.;
and/or by neutralization of the carbene, preferably using an acid.

As regards the initial POSs, they can comprise cyclic POSs (PoScy). It goes without saying that, in this case, the polymerization will be carried out by ring opening.

These POScy advantageously correspond to general formula (XI) below:

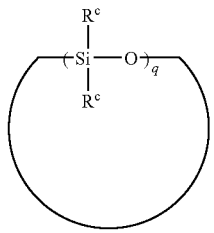        (XI)

in which:
$R^c$ represents hydrogen or an alkyl, alkenyl, aryl, aralkyl or alkylaryl group, which is optionally substituted,
and $3 \leq q \leq 12$.

In these oligocyclosiloxanes, $R^c$ is preferably chosen from alkyl groups containing from 1 to 8 carbon atoms inclusive, optionally substituted with at least one halogen atom, advantageously from methyl, ethyl, propyl and 3,3,3-trifluoropropyl groups and also from aryl groups, and advantageously from xylyl, tolyl and phenyl radicals.

In practice, the oligocyclosiloxane may be $D_4$ or $D_3$, which is optionally vinylated.

The initial POSs may be linear and, in this case, are advantageously selected from those of general formula (XII.1):

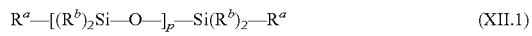

in which:
R$^a$ independently represent a hydroxyl, an alkyl or an aryl, optionally comprising one or more hetero atoms and optionally substituted with halogens,
R$^b$ independently represent an alkyl or an aryl, optionally comprising one or more hetero atoms and optionally substituted with halogens,
and p≧2.

The initial POSs may also be nonlinear, i.e. branched and/or in the form of POS resins comprising siloxyl units M: —(R)$_3$SiO$_{1/2}$ and Q: —SiO$_{4/2}$, and optionally D: —(R)$_2$SiO$_{2/2}$ and/or T: —RSiO$_{3/2}$.

The initial POSs can also be formed by mixtures of at least two of the following POS species: POScy, linear POSs and nonlinear POSs.

In a preferred embodiment, the initial POSs comprise POScy—preferably D3, D4, vinylated D4, hydrogenated D4—and linear POSs, for example polydialkyl (e.g. methyl) siloxanes MD$_p$M with p=0 to 20, preferably 0 to 10, and better still p=0: namely, disiloxanes, for example those belonging to the group comprising hexamethyldisiloxane (M2), vinylated M2, hydrogenated M2. Naturally, other functional groups could be envisioned for these linear POSs, in particular for these M2s, in variants of the invention.

The adjustment of the viscosity of the reaction medium during the polymerization is within the scope of those skilled in the art. It can be carried out by any means. The reaction medium is subjected to conventional reaction conditions.

According to a very advantageous mode of the method of the invention, it is arranged such that the final POS/POScy ratio in the reaction medium is greater than 85/15, preferably greater than or equal to 90/10, and even more preferably greater than or equal to 95/5.

According to advantageous variants, it is possible to envision using in the reaction medium:
POSs substituted with catalytic functions able to generate a carbene, and preferably catalytic functions derived from products of formula (I°), (I), (I'), (II), (II'), (III) or (III') as defined above;
and/or silanes of formula:

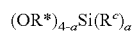

in which:
R$^c$ is a catalytic function able to generate a carbene, and preferably a catalytic function derived from a product of formula (I°), (I), (I'), (II), (II'), (III) or (III') as defined above,
R* is an alkyl,
a=1 to 3.

The method according to the invention also integrates, as required, conventional steps of neutralization and/or recovery/purification of the POSs targeted.

According to another of its aspects, the invention relates to a composition that can be used in particular for the preparation of polyorganosiloxanes (POSs) by ring-opening and/or redistribution polymerization of POSs, characterized in that it comprises:
linear or nonlinear POSs and/or cyclic POSs (PoScy);
a catalyst (C) comprising at least one carbene in which the two nonbonding electrons are preferably in the singlet form; with the exclusion of any catalyst formed by at least one metal(s)/carbene(s) complex, in particular Pt/carbene(s);
optionally, at least one solvent;
and, optionally, linear POSs, for example polydialkyl (e.g. methyl)siloxanes MD$_p$M with p=0 to 20, preferably 0 to 10, and better still p=0: namely, disiloxanes, for example those belonging to the group comprising hexamethyldisiloxane (M2), vinylated M2 and hydrogenated M2. Naturally, other functional groups could be envisioned for these linear POSs, in particular for these M2s, in variants of the invention.

This composition is that of an improved reaction medium according to the invention. This medium makes it possible to readily, effectively and economically obtain POSs, by ring-opening polymerization if the initial POSs are POScy and/or by redistribution polymerization.

This medium is in particular suitable for the method in accordance with the invention, as described above. Hence, it ensues that reference will subsequently be made to this description in order to define the components of the reaction composition according to the invention.

The same is true of the catalyst (C), the initial POSs and the base(s)-initiator(s) which are as defined above.

As regards the catalyst (C) it can be generated in situ from at least one precursor chosen from the group comprising one or more salt(s) corresponding to the carbene(s), capable of reacting with at least one base, so as to generate the carbene(s) in situ.

The composition can advantageously comprise at least one solubilization helper and/or the carbene(s) can be substituted with at least one solubilizing group. For further details on these means of solubilization, reference will be made to the description thereof provided above, in relation to the method of synthesizing POSs.

Preferably, the concentration of catalyst [C] (in mol per 100 g of initial POSs, for example linear and/or cyclic POS(s)) in the reaction medium is such that:
[C]≦1
preferably 10$^{-5}$≦[C]≦10$^{-1}$
and even more preferably 10$^{-5}$≦[C]≦10$^{-3}$.

In quantitative terms and by way of example, an initial reaction POS composition according to the invention may be as follows:
500 g of POS and/or of POScy (e.g. D4);
0 to 10 g, preferably 0.5 to 2 g, of chain stopper (e.g. M2);
0 to 10 g, preferably 0.01 to 1 g, of carbene precursor salt (formula (III) or (III'), e.g.: imidazolium salt);
0 to 10 g, preferably 0.01 to 0.5 g, of base (e.g.: t-Bu-OK);
0.1 to 10 ml of solvent (e.g. THF).

The present invention is also directed toward a silicone composition rich in at least one POS obtained by ring-opening and/or redistribution polymerization of POSs, with ring-opening (ROP) when at least some of the POSs are POScy, characterized in that it comprises catalyst (C) as defined above.

Another subject of the invention consists of a silicone composition comprising at least one POS obtained by ring opening and then ring-opening/redistribution polymerization of POScy, characterized by a POS/POScy ratio of greater than 85/15, preferably greater than or equal to 90/10, and even more preferably greater than or equal to 95/5.

These compositions, which can be described as "final", correspond, inter alia, to those obtained at the end of the method for preparing POSs as described above or to those obtained from the rectional composition targeted independently in the context of the invention and itself also described above.

In these final compositions, "carbene" catalyst residues may be present in trace amounts. Similarly, some other components of the abovementioned rectional composition may be found in these final compositions.

The invention also relates, as novel products to:

POSs substituted with functions able to generate carbenes, preferably derived from products of formula (I°), (I), (I'), (II), (II'), (III) or (III') as defined above;

and silanes of formula:

(OR*)$_{4-a}$Si(R$^c$)$_a$ in which:

R$^c$ is a catalytic group able to generate a carbene, and preferably a catalytic group derived from a product of formula (I°), (I), (I'), (II), (II'), (III) or (III') as defined above, R* is an alkyl, a=1 to 3.

The invention opens up a new pathway in the catalysis of ring-opening and/or redistribution polymerization of POSs and/or of POScy (ROP), in the presence of carbenes or of carbene precursors, for the preparation of POSs. This pathway is effective in terms of catalytic activity, of selectivity (better conversion rates and yield POS/POScy>90/10), of ease of use (low temperature, little or no purification), and of obtaining POSs having good polymolecularity indices and possibly having high viscosities, inter alia.

This effectiveness is all the more advantageous since it is obtained without abandoning the imperatives of cost, safety, non-ecotoxicity and ease of use.

The examples which follow will make it possible to understand the method and the catalyst according to the invention more clearly, by revealing all the advantages thereof and the possible variants of implementation.

EXAMPLES

Generalities:

The precursor imidazolium salt 1 is prepared according to the conventional procedure described in the literature using HBF$_4$ as Brönsted acid. It has the following structure:

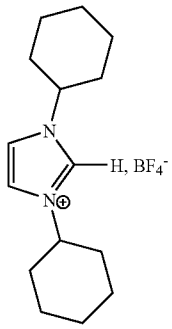

The other starting materials are commercially available.

Example 1

10 g of octamethylcyclotetrasiloxane (D4) and 100 mg of hexamethyldisiloxane (M2) are mixed in a 30 ml flask. 100 mg of imidazolium salt 1 (0.34 mmol) and 39 mg of t-BuOK (0.34 mmol) are placed in a weighing tube. 0.5 ml of anhydrous THF is added and the suspension obtained is rapidly added to the flask containing the M2 and the D4.

The reaction mixture is stirred at ambient temperature for 24 h. It gradually becomes viscous and a silicon NMR analysis shows that 95% of the D4 has polymerized and is in the form of a polysiloxane chain.

Example 2

10 g of octamethylcyclotetrasiloxane (D4) and 100 mg of hexamethyldisiloxane (M2) are mixed in a 30 ml flask. 100 mg of imidazolium salt 1 (0.34 mmol) and 39 mg of t-BuOK (0.34 mmol) are placed in a weighing tube. 0.5 ml of anhydrous THF is added and the suspension obtained is rapidly added to the flask containing the M2 and the D4.

The reaction mixture is stirred at 60° C. for 2 h. It gradually becomes viscous and a silicon NMR analysis shows that 95% of the D4 has polymerized and is in the form of a polysiloxane chain.

Counterexample 1

10 g of octamethylcyclotetrasiloxane (D4) and 100 mg of hexamethyldisiloxane (M2) are mixed in a 30 ml flask. 39 mg of t-BuOK (0.34 mmol) are placed in a weighing tube. 0.5 ml of anhydrous THF is added and the suspension obtained is rapidly added to the flask containing the M2 and the D4.

The reaction mixture is stirred at ambient temperature for 24 h. It remains very fluid and the silicon NMR analysis shows that less than 5% of the D4 has polymerized.

Counterexample 2

10 g of octamethylcyclotetrasiloxane (D4) and 100 mg of hexamethyldisiloxane (M2) are mixed in a 30 ml flask. 39 mg of t-BuOK (0.34 mmol) are placed in a weighing tube. 0.5 ml of anhydrous THF is added and the suspension obtained is rapidly added to the flask containing the M2 and the D4.

The reaction mixture is stirred at 60° C. for 2 h. It becomes slightly more viscous and silicon NMR analysis shows that only 30% of the D4 has polymerized so as to be in the form of a polysiloxane chain.

Discussions:

The above examples show that it is possible to polymerize octamethyltetracyclosiloxane (D4), in the presence of a chain limiter (with diaminocarbene-type catalysts at ambient temperature and in temperature. The rate of conversion of the D4 is greater than or equal to 95% relative to the initial amount. The structure of the polyorganosiloxane obtained is identical to that of an oil of H47 type.

The invention claimed is:

1. A method for preparing polyorganosiloxanes (POSs) by ring-opening and/or redistribution polymerization of POSs, in the presence of a catalyst (C), wherein said catalyst (C) comprises at least one carbene.

2. The method of claim 1, wherein the carbene of catalyst (C) comprises two nonbonding electrons, which are in the singlet or triplet form.

3. The method of claim 1, wherein the carbene of catalyst (C) has a general structure represented by formula) (I°):

wherein:

X and Y are independently chosen from the group comprising S, P, Si, N and O;

X and Y are optionally substituted;

X and Y can be connected via at least one optionally substituted five-, six- or seven-membered hydrocarbon-based ring; or a five-, six- or seven-membered heterocycle comprising one or more hetero atoms chosen from the group comprising: S, P, Si, N and O, and optionally substituted.

4. The method of claim 3, wherein the carbene of catalyst (C) has a general structure represented by formula (I), (I') or (I"):

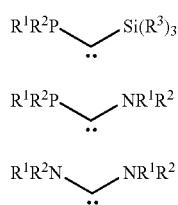

wherein:
$R^1$, $R^2$ and $R^3$, which may be identical or different, independent represent an alkyl group; an optionally substituted cycloalkyl group; an optionally substituted aryl group; or the groups $R^1$ and $R^2$ can together form an optionally substituted five- or six-membered hydrocarbon-based ring; or a five- or six-membered heterocycle comprising one or more hetero groups chosen from the group comprising: S, P, Si, N and O, and optionally substituted.

5. The method of claim 3, wherein the carbene of catalyst (C) corresponds to formula (II) or (II'):

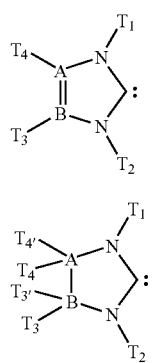

wherein:
A and B independently represent C or N, with the proviso that
in formula (II), when A represents N, then T4 is not present and when B represents N, then T3 is not present;
in formula (II'), when A represents N, then T4 or T4' is not present, and when B represents N, then T3 or T3' is not present;
T3, T3', T4 and T4' independently represent a hydrogen atom; an alkyl group; a cycloalkyl group optionally substituted with alkyl or alkoxy; an aryl group optionally substituted with alkyl or alkoxy; an alkenyl group, and alkynyl group; or an arylalkyl group in which the aryl part is optionally substituted with alkyl or alkyoxy; or T3 and T4 can form, together and with A and B when the latter each represent a carbon atom, an aryl, it being understood that, in this case, T3' and T4' are not present;
T1 and T2 independently represent an alkyl group; an alkyl group optionally substituted with alkyl; an alkyl group that is perfluorinated or optionally substituted with a perfluoroalkyl group; a cycloalkyl group optionally substituted with alkyl or alkoxy; an aryl group optionally substituted with alkyl or alkoxy; an alkenyl group; an alkynyl group; or an arylalkyl group in which the aryl part is optionally substituted with alkyl or alkoxy; or
T1 and T2 independently represent a monovalent radical of formula (V) below:

-V1-V2 (V)

wherein:
V1 is a saturated or unsaturated, hydrocarbon-based divalent group,
V2 is a monovalent group chosen from the group of the following substituents:
alkoxy, —$OR^a$ with $R^a$ corresponding to hydrogen, alkyl or aryl;
silyl, —$Si(OR^b)_x(R^c)_{3-x}$ with $R^b$ corresponding to hydrogen, alkyl, silyl or siloxanyl, $R^c$ corresponding to alkyl or aryl, and x being an integer between 0 and 3;
amine; or
the substituents T1, T2, T3, T3', T4 and T4' can form, in pairs, when they are located on two adjacent vertices in formulae (II) and (II'), a saturated or unsaturated hydrocarbon-based chain.

6. The method of claim 1, wherein the carbene is prepared separately, and/or is generated in situ from at least one precursor.

7. The method of claim 6, wherein the precursor is a salt corresponding to the carbene, which is reacted with at least one base, so as to generate the carbene in situ.

8. The method of claim 7, wherein the corresponding salt is at least one corresponding heterocyclic salt of general formula (III) or (III'):

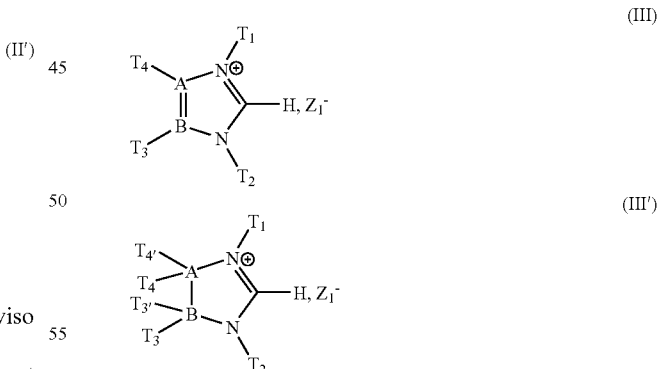

wherein:
A and B independently represent C or N, with the proviso that:
in formula (III), when A represents N, then T4 is not present, and when B represents N, then T3 is not present;
in formula (III'), when A represents N, then T4 or T4' is not present, and when B represents N, then T3 or T3' is not present;

T3, T3', T4 and T4' independently represent a hydrogen atom; an alkyl group; a cycloalkyl group optionally substituted with alkyl or alkoxy; an aryl group optionally substituted with alkyl or alkoxy; an alkenyl group; an alkynyl group; or an arylalkyl group in which the aryl part is optionally substituted with alkyl or alkoxy; or T3 and T4 can form, together and with A and B when the latter each represent a carbon atom, an aryl, it being understood that, in this case, T3' and T4' are not present;

T1 and T2 independently represent an alkyl group; an alkyl group optionally substituted with alkyl; an alkyl group that is perfluorinated or optionally substituted with a perfluoroalkyl group; a cycloalkyl group optionally substituted with alkyl or alkoxy; an aryl group optionally substituted with alkyl or alkoxy; an alkenyl group; an alkynyl group; or an arylalkyl group in which the aryl part is optionally substituted with alkyl or alkoxy; or T1 and T2 independently represent a monovalent radical of formula (V) below:

-V1-V2     (V)

wherein:
V1 is a saturated or unsaturated, hydrocarbon-based divalent group,
V2 is a monovalent group chosen from the group of the following substituents:
   alkoxy, —$OR^a$ with $R^a$ corresponding to hydrogen, alkyl or aryl;
   silyl, —$Si(OR^b)_x(R^c)_{3-x}$ with $R^b$ corresponding to hydrogen, alkyl, silyl or siloxanyl, $R^c$ corresponding to alkyl or aryl, and x being an integer between 0 and 3;
   amine; or
the substituents T1, T2, T3, T3', T4 and T4' can form, in pairs, when they are located on two adjacent vertices in formulae (III) and (III'), a saturated or unsaturated hydrocarbon-based chain;

Z1 independently represents an anion derived from a Brönsted acid (protic acid) chosen from the group consisting of:
carboxylic acids of formula $G_o$-COOH in which $G_o$ represents an alkyl; an aryl optionally substituted with one or more $C_1$-$C_6$ alkyls;
sulfonic acids of formula $G_o$-$SO_3H$ in which $G_o$ is as defined above;
phosphoric acids of formula $G_o$-$PO_3H$ in which $G_o$ is as defined above;
the following inorganic acids: HF, HCl, HBr, HI, $H_2SO_4$, $H_3PO_4$, $HClO_4$ and $HBF_4$ taken alone or in combination with one another;
and mixtures thereof.

9. The method of claim 1, wherein said method is carried out, by homogeneous catalysis, in a liquid reaction medium in which are at least partially solubilized said catalyst (C) and/or its precursor(s) and the initial POSs, and optionally at least one base.

10. The method of claim 1, wherein the solubility of said catalyst (C) and/or its precursor(s) is controlled by means of at least one solubilization helper and/or by using at least one carbene substituted with at least one appropriate group.

11. The method of claim 1, wherein said method is performed at a temperature T (°C.) such that T≦200.

12. The method of claim 1, wherein the concentration of catalyst (C), in mol per 100 g of initial POSs, in a reaction medium is such that [C]≦1.

13. The method of claim 1, wherein the initial POSs comprise cyclic POSs (POScy) chosen from those corresponding to general formula (XI) below:

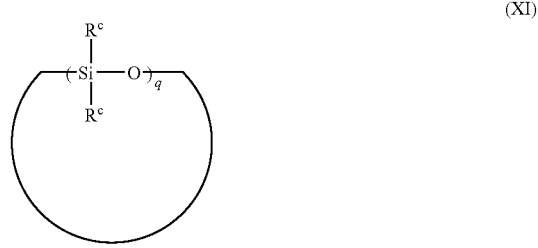

(XI)

wherein $R^c$ represents hydrogen or an alkyl or aryl radical and 3≦q≦12.

14. The method of claim 1, wherein the initial POSs are linear and are selected from those of general formula (XII.1):

$R^a$—[$(R^b)_2Si$—O]$_p$—$Si(R^b)_2$—$R^a$     (XII.1)

wherein:
$R^a$ independently represent a hydroxyl, an alkyl or an aryl, optionally comprising one or more hetero atoms and optionally substituted with halogens,
$R^b$ independently represent an alkyl or an aryl, optionally comprising one or more hetero atoms and optionally substituted with halogens,
and p≧2.

15. The method of claim 14, wherein a final POS/POScy ratio in the reaction medium is greater than 85/15.

16. The method of claim 4, wherein the following are used:
POSs substituted with catalytic functions able to generate carbenes, and derived from products of formula (I°), (I) or (I');
and/or silanes of formula:

$(OR^*)_{4-a}Si(R^c)_a$ wherein:
$R^c$ is a catalytic function able to generate a carbene, and derived from a product of formula (I°), (I) or (I'),
R* is an alkyl,
a=1 to 3.

17. The method of claim 5, wherein the following are used:
POSs substituted with catalytic functions able to generate carbenes, and derived from products of formula (II) or (II');
and/or silanes of formula:

$(OR^*)_{4-a}Si(R^c)_a$ wherein:
$R^c$ is a catalytic function able to generate a carbene, and derived from a product of formula (II) or (II'),
R* is an alkyl,
a=1 to 3.

18. The method of claim 8, wherein the following are used:
POSs substituted with catalytic functions able to generate carbenes, and derived from products of formula (III) or (III');
and/or silanes of formula:

$(OR^*)_{4-a}Si(R^c)_a$ wherein:
$R^c$ is a catalytic function able to generate a carbene, and derived from a product of formula (III) or (III'),
R* is an alkyl,
a=1 to 3.

19. A composition that can be used in particular for the preparation of polyorganosiloxanes (POSs) by polymerization and/or redistribution of POSs, comprising
   linear or nonlinear POSs and/or cyclic POSs (POScy);
   a catalyst (C) comprising at least one carbene; with the exclusion of any catalyst formed by at least one metal/carbene complex, in particular Pt/carbene;
   optionally, at least one solvent;
   and, optionally, linear POSs.

20. The composition of claim 19, wherein the carbene of catalyst (C) comprises two nonbonding electrons, which are in the singlet or triplet form.

21. The composition of claim 19, wherein the initial POSs comprise cyclic POSs (POScy) chosen from those corresponding to general formula (XI) below:

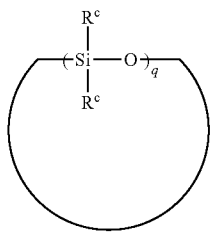

(XI)

wherein $R^c$ represents hydrogen or an alkyl or aryl radical and $3 \leq q \leq 12$.

22. The composition of claim 19, wherein catalyst (C) is generated in situ from at least one precursor chosen from the group comprising at least one salt corresponding to the carbene, capable of reacting with at least one base, so as to generate the carbene in situ.

23. The composition of claim 19, further comprising at least one solubilization helper and/or the carbene is substituted with at least one solubilizing group.

24. The composition of claim 19, wherein the concentration of catalyst (C), in mol per 100 g of initial POSs, in a reaction medium is such that $[C] \leq 1$.

25. A silicone composition, comprising:
   at least one POS obtained by polymerization and/or redistribution of POSs;
   at least one residue of catalyst (C) comprising at least one carbene.

26. A silicone composition comprising at least one POS obtained by ring opening and then polymerization and/or redistribution of POScy, having a final POS/POScy ratio of greater than 85/15.

27. POSs substituted with catalytic functions able to generate carbenes derived from products of formula (I°), (I) or (I') as defined in claim 4.

28. POSs substituted with catalytic functions able to generate carbenes derived from products of formula (II) or (II') as defined in claim 5.

29. POSs substituted with catalytic functions able to generate carbenes derived from products of formula (III) or (III') as defined in claim 8.

30. Silanes of formula:

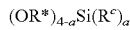
$$(OR^*)_{4-a}Si(R^c)_a$$

wherein:
   $R^c$ is a catalytic function able to generate a carbene, and derived from a product of formula (I°) or (I), as defined in claim 4,
   $R^*$ is an alkyl,
   $a=1$ to 3.

31. Silanes of formula:

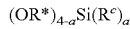
$$(OR^*)_{4-a}Si(R^c)_a$$

wherein:
   $R^c$ is a catalytic function able to generate a carbene, and derived from a product of formula (II) or (II') as defined in claim 5,
   $R^*$ is an alkyl,
   $a=1$ to 3.

32. Silanes of formula:

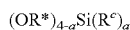
$$(OR^*)_{4-a}Si(R^c)_a$$

wherein:
   $R^c$ is a catalytic function able to generate a carbene, and derived from a product of formula (III) or (III') as defined in claim 8,
   $R^*$ is an alkyl,
   $a=1$ to 3.

* * * * *